(12) United States Patent
Deckers et al.

(10) Patent No.: US 10,105,801 B2
(45) Date of Patent: Oct. 23, 2018

(54) MODULAR HEAT EXCHANGER WITH SECTIONS INTERCONNECTED BY CONNECTORS

(71) Applicant: Dejatech Holding B.V., Belfeld (NL)

(72) Inventors: Jan Hubertus Deckers, Belfeld (NL); Paulus Mathijs Maria Thijssen, Belfeld (NL)

(73) Assignee: Dejatech Holding B.V., Belfeld (NL)

(*) Notice: Subject to any disclaimer, the term of this patent is extended or adjusted under 35 U.S.C. 154(b) by 814 days.

(21) Appl. No.: 14/261,530

(22) Filed: Apr. 25, 2014

(65) Prior Publication Data

US 2014/0318739 A1 Oct. 30, 2014

(30) Foreign Application Priority Data

Apr. 26, 2013 (NL) .................... 2010725

(51) Int. Cl.
| | |
|---|---|
| *F28F 9/26* | (2006.01) |
| *B23P 15/26* | (2006.01) |
| *F24H 1/32* | (2006.01) |
| *F24H 9/14* | (2006.01) |
| *F28F 3/08* | (2006.01) |
| *F28F 21/08* | (2006.01) |

(52) U.S. Cl.
CPC ................ *B23P 15/26* (2013.01); *F24H 1/32* (2013.01); *F24H 9/146* (2013.01); *F28F 9/26* (2013.01); *F28F 9/264* (2013.01); *F28F 3/086* (2013.01); *F28F 21/084* (2013.01); *F28F 21/088* (2013.01); *F28F 2275/025* (2013.01); *Y02B 30/108* (2013.01); *Y10T 29/4935* (2015.01)

(58) Field of Classification Search
CPC ............ F24H 9/146; F24H 1/32; F16L 17/025
USPC ............... 122/209.1, 210, 231, 367.1, 367.3; 165/164, 168
See application file for complete search history.

(56) References Cited

U.S. PATENT DOCUMENTS

| | | | | |
|---|---|---|---|---|
| 676,340 | A | * | 6/1901 | Porter ........................ 122/225 R |
| 1,876,475 | A | * | 9/1932 | Stauffer ................... F23M 9/00 110/315 |
| 1,970,500 | A | * | 8/1934 | Donohue .................. F24H 1/32 122/210 |
| 2,615,740 | A | * | 10/1952 | Nathan ................. F16L 17/025 277/605 |

(Continued)

FOREIGN PATENT DOCUMENTS

| | | |
|---|---|---|
| CH | 339723 A | 7/1959 |
| DE | 4126706 C1 | 10/1992 |

(Continued)

OTHER PUBLICATIONS

Dutch Search Report—NL2010725—Date of Completion: Jan. 10, 2014.

*Primary Examiner* — Allen Flanigan

(74) *Attorney, Agent, or Firm* — Banner & Witcoff, Ltd.

(57) ABSTRACT

Heat exchanger, comprising a series of interconnected modules, each module comprising at least part of a water duct and part of a flue duct, wherein at least the parts of the water ducts of successive modules are interconnected, forming at least one continuous water duct through and/or along a number of said modules, wherein water duct parts of two adjacent modules are interconnected by a connector inserted into an opening in at least one of the modules forming a sealing connection.

26 Claims, 5 Drawing Sheets

(56) References Cited

U.S. PATENT DOCUMENTS

| | | | | | |
|---|---|---|---|---|---|
| 2,935,052 | A | * | 5/1960 | Mueller | F24H 1/32 |
| | | | | | 122/225 R |
| 3,215,125 | A | * | 11/1965 | Mueller | F24H 1/32 |
| | | | | | 122/225 R |
| 3,353,850 | A | * | 11/1967 | Butz et al. | F16L 13/103 |
| | | | | | 122/231 |
| 3,626,908 | A | * | 12/1971 | Arndt | F24H 9/146 |
| | | | | | 122/231 |
| 4,480,591 | A | * | 11/1984 | Deckers | F24H 1/38 |
| | | | | | 122/18.1 |

FOREIGN PATENT DOCUMENTS

| | | | |
|---|---|---|---|
| EP | 2486995 | A1 | 8/2012 |
| FR | 2279037 | A1 | 2/1976 |
| FR | 2617579 | A1 | 1/1989 |
| GB | 2468236 | A | 9/2010 |
| NL | 2002567 | C | 8/2010 |
| WO | 2008004855 | A2 | 1/2008 |
| WO | 2010052648 | A1 | 5/2010 |

\* cited by examiner

MODULAR HEAT EXCHANGER WITH SECTIONS INTERCONNECTED BY CONNECTORS

CROSS-REFERENCE TO RELATED APPLICATIONS

This application claims the benefit of priority of Dutch application NL 2010725, filed Apr. 26, 2013, the contents of which are hereby incorporated by reference in its entirety.

TECHNICAL FIELD

The invention relates to a heat exchanger comprising interconnected modules.

BACKGROUND

Heat exchangers for use in for example domestic central heating boilers and/or tap water boilers are known in the art to be made for example of iron, steel or light metal, such as aluminum or aluminum alloy. These heat exchangers are known to for example be cast using lost core technology. It is known to cast a complete heat exchanger body in one piece, which negates the necessity of assembling the heat exchanger body but requires relatively large molds and casting equipment, and furthermore requires a different mold for each type or size of heat exchanger, for example for adjusting the capacity of the heat exchanger. Inside the heat exchanger flue passages and water ducts are provided for exchanging heat between flue gasses from a burner flowing through the flue ducts and water flowing through the water ducts. For forming these ducts the core has to be complicated and has to be removed after casting. To this end openings have to be provided through which the core can be removed. The ducts and passages then have to be thoroughly cleaned through said openings, after which the openings then have to be machined for receiving closures, such as screw stop with sealing O-rings, or stops are to be welded into the openings. This is very time consuming and costly and prone to failure. Moreover, the relatively large volume of the heat exchanger body can easily lead to damage to the body, for example during cooling and handling.

In order to accommodate for smaller molds and easier adaptation to size and capacity heat exchangers have been proposed which comprise a series of individually cast modules. The modules can be assembled into a heat exchanger having a desired capacity by adjusting the number of modules. The smaller size of the modules makes casting and handling easier. Each module will comprise part of the flue duct or ducts and part of the water ducts. Obviously this has the effect that the modules have to be assembled, whereby the parts of the water duct or ducts and parts of the flue duct or ducts of the modules have to be interconnected in order to form continuous ducts.

EP0404259 discloses a modular heat exchanger in which different modules are use for the flue ducts and the water ducts. These are alternatingly placed in a row, forming a heat exchanger body. Each module having a water duct has an individual inlet and outlet at diametrical opposing positions. Though not disclosed in EP0404259, the inlets and outlets of the modules will be connected by an inlet manifold and an outlet manifold respectively, for forming one water circuit through the respective modules. This requires individual connections for each inlet and each outlet to the respective manifolds. A combustion chamber is formed extending through all modules, integrating a burner in the heat exchanger.

EP0645591 discloses a modular heat exchanger comprising a series of modules interconnected to form flue ducts and water ducts. Each module comprises two side metal assemblies, each including a closed gap for forming a single space for water. From a wall of said gap fins extend outward, such that when two such modules are placed adjacent to each other, such that a zig-zag flue duct is formed by the fins. Though not disclosed in EP0645591, the spaces for water in each of the modules will be connected by an inlet manifold and an outlet manifold respectively, for forming one water circuit through the respective modules. This requires individual connections for each inlet and each outlet to the respective manifolds. A combustion chamber is formed extending through all modules, integrating a burner in the heat exchanger, fed by a fan sending a mixture of gas and air into said burner space.

EP0843135 discloses a modular heat exchanger comprising a series of modules, each having at least a water duct part and a flue duct forming part with heat exchanging elements. The flue duct forming parts are open to one side and in contact with a water duct part extending through said module for exchanging heat between flue gasses and water. At least the parts of the water ducts of successive modules are interconnected, forming at least one continuous water duct through and along a number of said modules. To this end each water duct part of a module comprises an inlet and an outlet. The inlets of the modules are connected by a feed manifold and the outlets are connected by a return manifold, the feed manifold and the return manifold comprising tubes extending alongside the series of modules, each inlet and outlet individually coupled to the respective manifold. In EP0843135 each module is individually provided with a burner and fan.

These known heat exchangers are modular but need complicated assembling, especially of the manifolds to the water duct parts of the different modules. Moreover, these known heat exchangers are nor very compact, due to inter alia the externally provided manifolds. Furthermore these manifolds have to be tailored to the number of modules in a series. This means that for different capacities of heat exchangers different manifolds are needed.

SUMMARY

The present disclosure aims at providing an alternative modular heat exchanger. The present disclosure aims at providing a compact modular heat exchanger. The present disclosure aims at providing an modular heat exchanger reducing or mitigating at least one of the disadvantages of the known heat exchangers. The present disclosure aims at providing a modular heat exchanger which can be scaled easily to different capacities. The present disclosure aims at providing a method for forming an alternative modular heat exchanger.

At least one of these and/or other aims is obtained with a heat exchanger, module, boiler and/or method according to this disclosure.

In a first aspect a heat exchanger according to this disclosure can comprise a series of interconnected modules, each module comprising at least part of a water duct and part of a flue duct. At least the parts of the water ducts of successive modules are interconnected, forming at least one continuous water duct through and/or along a number of said modules. Water duct parts of two adjacent modules are interconnected by a connector inserted into an opening in at least one of the modules forming a sealing connection.

In a heat exchanger according to the disclosure at least part of the manifolds connecting the water duct parts of the different modules may be integrated in the modules, connected by the connectors. In such embodiments by connecting the modules via at least said connectors, the water duct parts of the modules are directly coupled to each other, without the necessity of providing a manifold along the heat exchanger modules. Moreover this negates the necessity of individually connecting the water duct parts to such manifold extending alongside the heat exchanger modules. Furthermore this provides for automatic adjustment of the length of the manifold thus formed, by way of one or more connecting ducts incorporating the connectors, to the number of modules used in a heat exchanger.

In a preferred embodiment the heat exchanger integrates in this way three connecting ducts for interconnecting the water duct parts of the different modules of a heat exchanger, such that the combined water duct through the heat exchanger has substantially a Tichelmann design. A Tichelmann design is a known principle of lay out of ducts in heating systems wherein the length of the ducts to and from a heating system should be the same for each component. Applied to a heat exchanger according to the present disclosure this means that the length and flow capacity between an inlet of the combined water duct system of the heat exchanger to the outlet of said water duct system should be the same for all paths through the different modules. In other words approximately the same amount of water should be fed per minute through each of the modules, in order to prevent intolerable temperature differences between the modules. Preferably the said inlet and outlet of the heat exchanger's combined water duct system are provided at the same longitudinal end of the series of modules, for example at an end module, such that connection to an appropriate heating system is made even more easy.

In a heat exchanger according to the present disclosure preferably the manifolds are integrated in the modules, including said connectors, also because this will prevent undesired cooling of the water in the manifold, as will happen in the known heat exchangers with external manifolds, since these are subject to temperatures outside the heat exchanger, for example room temperature.

BRIEF DESCRIPTION OF THE DRAWINGS

The present invention shall be further elucidated in the following description, with reference to the drawings, in which.

DETAILED DESCRIPTION

Figure 1:
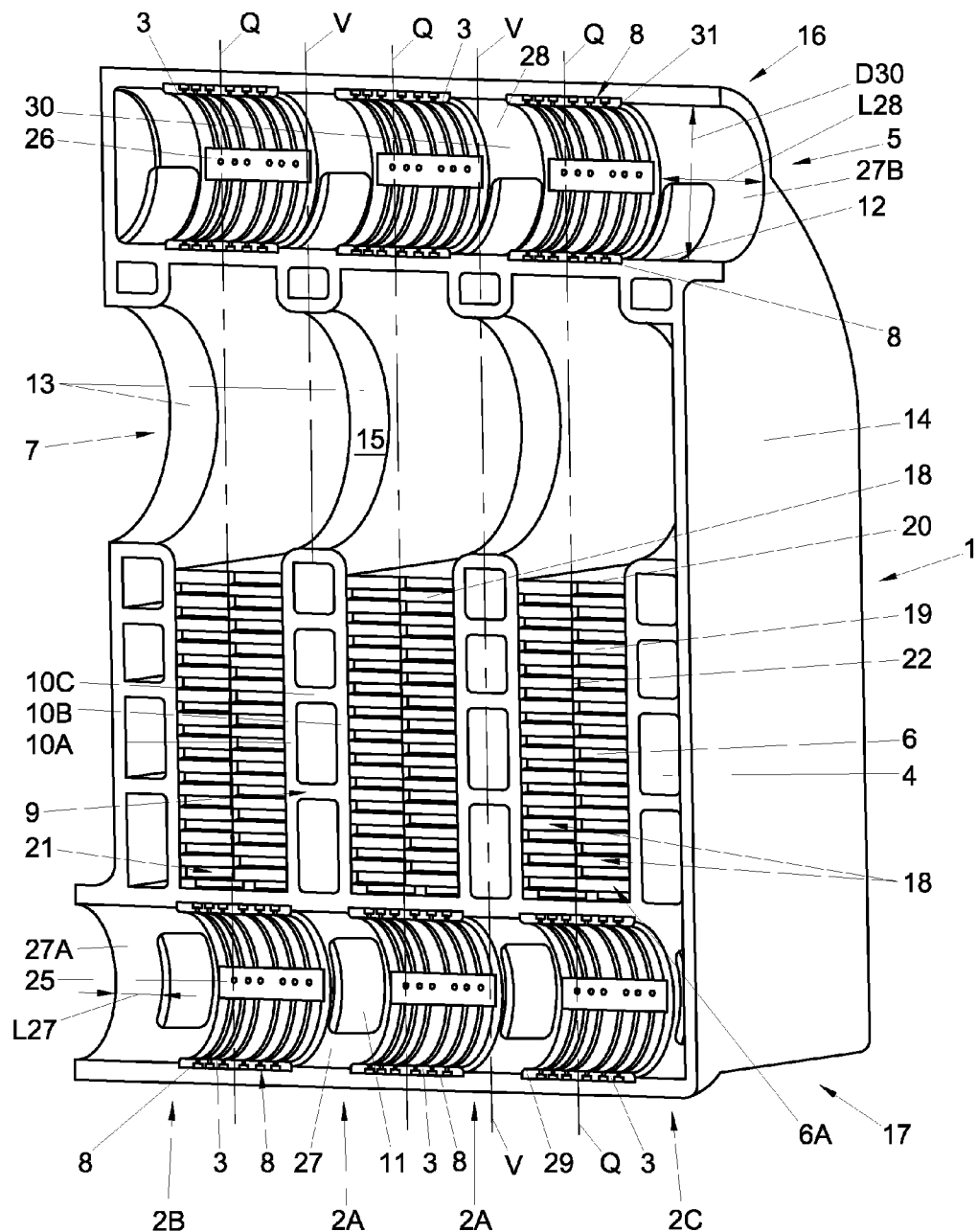
FIG. 1 shows a heat exchanger, partly in cross section, having four modules.

In this description different embodiments of heat exchangers and parts thereof, as well as heating circuits equipped therewith are disclosed and described by way of example only. In these embodiments the same or similar parts have the same or similar reference signs. Combinations of parts of the embodiments shown are also considered to have been disclosed herein. In this description a heat exchanger as to be understood as an exchanger for exchanging heat between heated flue gasses from a burner and water flowing through one or more water channels within said heat exchanger. Preferably a flame receiving space is provided over and/or into which a burner can be inserted, such that said heated flue gasses are actively created, during use, within said heat exchanger. In an alternative the burner can be at least partly integrated in the heat exchanger, for example by extrusion, casting and/or machining. Such heat exchangers are especially, but not exclusively suitable in domestic and commercial heating systems such as boilers and central heating systems, such as for space heating and/or tap water heating systems.

In the following description some or all of the parts can also be made by casting, such as but not limited to injection moulding, sand or otherwise lost core moulding or casting or the like, possibly combined with machining, such as but not limited to grinding, turning, milling, drilling and the like known machining methods. Also or alternatively other techniques can be used, where applicable, such as but not limited to extrusion.

In this description light metal is at least to be understood as including non-ferro metal and non-ferro metal alloy having a density of less than 4500 kg/m$^3$. Preferred materials are aluminum and aluminum alloy.

In this description wording like top and bottom and sides are used as references only, without limiting the possible positioning of the heat exchanger or parts thereof in use. In this description top and bottom are used as defined in FIGS. 1, 2 and 4, where the flame receiving space is shown at the top and the outlet for gas is at the bottom.

In this description words like substantially and about indicate that slight deviations from a dimension or orientation to which they refer is allowable, for example less than 20%, more preferably less than 15%, for example up to 10%.

In this description bonding has to be understood as forming an adhesive connection between two or more parts using an elastic bonding agent. Especially suitable is a glue or adhesive which after curing is still flexible and elastically deformable. Preferably the bonding agent is heat resistant to temperatures above 120° C., preferably above 150° C., more preferably above 170° C. A glue can be used having a temperature resistance up to 180° C. or above. A glue can be used having a use temperature range between about −4 and +120° C., preferably between about −20 and +150° C., more preferably between about −40 and +170° C., even more preferably between at least −55 and 180° C. or higher (e.g. PSI S406). A temperature range should be understood as a range of temperatures in which the glue maintains at least most of its elastic and bonding properties, such that in a heat exchanger at least the bonding maintains pressure resistant and fluid and gas tight. Pressure resistant is in this context to be understood as at least resistant to pressures in an adjoining space of above 2 bar, preferably above 4 bar, more preferably at least to 10 bar. The desired pressure resistance can be as high as 20 bar or above. One bar is 100.000 Pascal or 0.1 MPa. Reference can be made to adhesion to peel, according to ASTM C794.

Elastic bonding agent, such as glue or adhesive should be understood as an agent which, after curing, has during use, a high yield strength and high yield limit. This means it can be stretched to a relatively high degree before breaking. The elasticity is preferably such that the yield limit is more than about 300%, preferably more than about 400%, more preferably more than about 550% and in particular preferably about 650% or more. Preferably this high yield limit is maintained over the temperature range during use of the heat exchanger. The yield limit can e.g. be measured according to ASTM D412.

The bonding agent can be a silicone or elastomeric based adhesive, preferably curing at about room temperature to a rubber like component which is water and gas tight. A bonding layer formed by said bonding agent is preferably pressure resistant to at least about 4 Bar, more preferably to about 10 Bar and even more preferably to about 20 Bar or above, wherein the bonding agent is preferably applied to unprimed metal of the parts. An example of such bonding agent is Dow Corning 7091, which has a normal temperature range of use between −55 and +180° C., and a yield limit of about 680%.

All kinds of combinations can be contemplated of yield limit, pressure resistance and temperature range.

Dow Corning® 7091 Adhesive/Sealant is a high-performance, neutral-cure silicone that cures at room temperature to a tough, flexible rubber, suitable for the use described herein. Dow Corning 7091 remains flexible and stable from −55° to 180° C. (−67° to 356° F.), and is a one-component, non-sag sealant. It can have a tear strength of 86 ppi and a tensile strength of about 363 psi. This adhesive is only provided by way of example and should not be considered limiting the scope in any way.

By using such a flexible bonding agent parts of the heat exchanger can be connected to each other, forming fluid, especially water, and gas tight seals without having to add gaskets, seals or the like, which will remain fluid and gas tight over a large temperature range. Moreover, such seals are relatively inexpensive and are pressure resistant to relatively high pressures. Furthermore, due to the high flexibility, problems with different expansion rates and directions of the different parts bonded together are avoided.

Alternative or additional to bonding other connecting techniques and materials could be used, such as but not limited to welding, screws, nuts and bolts, clamping.

FIG. 1 shows a heat exchanger 1 comprising a series of modules 2, in side to side relationship. In this embodiment the heat exchanger 1 comprises four modules, interconnected by connectors 3. The heat exchanger 1 thus comprises a series of interconnected modules 2. Each module comprises at least a part 4 of a water duct 5 and a part 6 of a flue duct 7. At least the parts 4 of the water duct 5 of successive modules 2 are interconnected, forming at least one continuous water duct 5 through and/or along a number of said modules 2 for example shown in FIG. 5. Water duct parts 4 of two adjacent modules 2 are interconnected by the connector or connectors 3, to which end the connector 3 is inserted into an opening 8 in at least one of the modules 2, forming a sealing connection. To this end the connector can be bonded or glued in the at least one opening 8. Alternatively it can be fixed in a different manner, for example by press fitting, screwing or the like. Bonding or gluing can have the advantage that the opening does not have to be machined after casting, as is necessary for most if not all other means for mounting.

Figure 2:
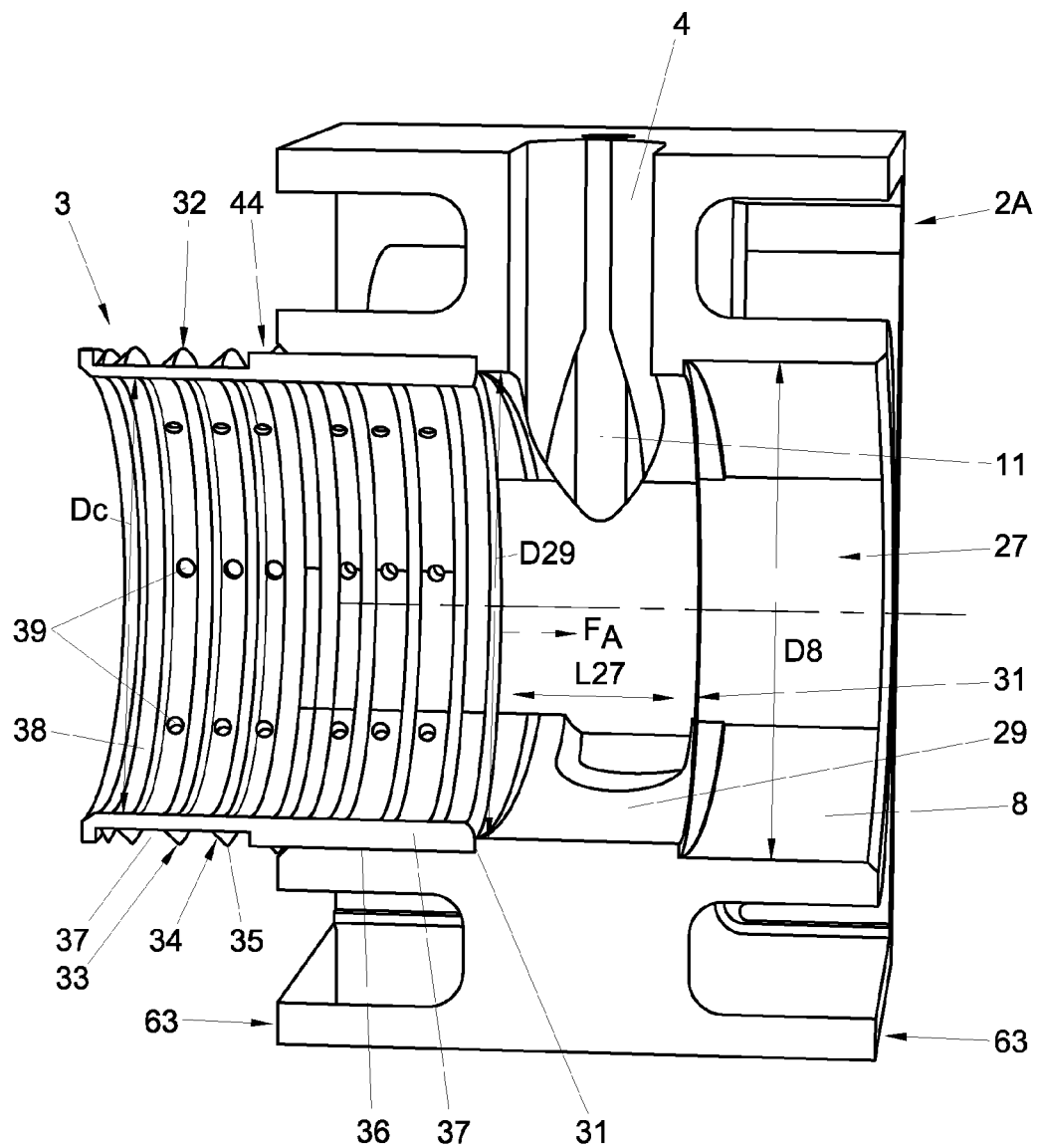
FIG. 2 shows part of a module of a heat exchanger, with a connector, in cross sectional view.
Figure 3:
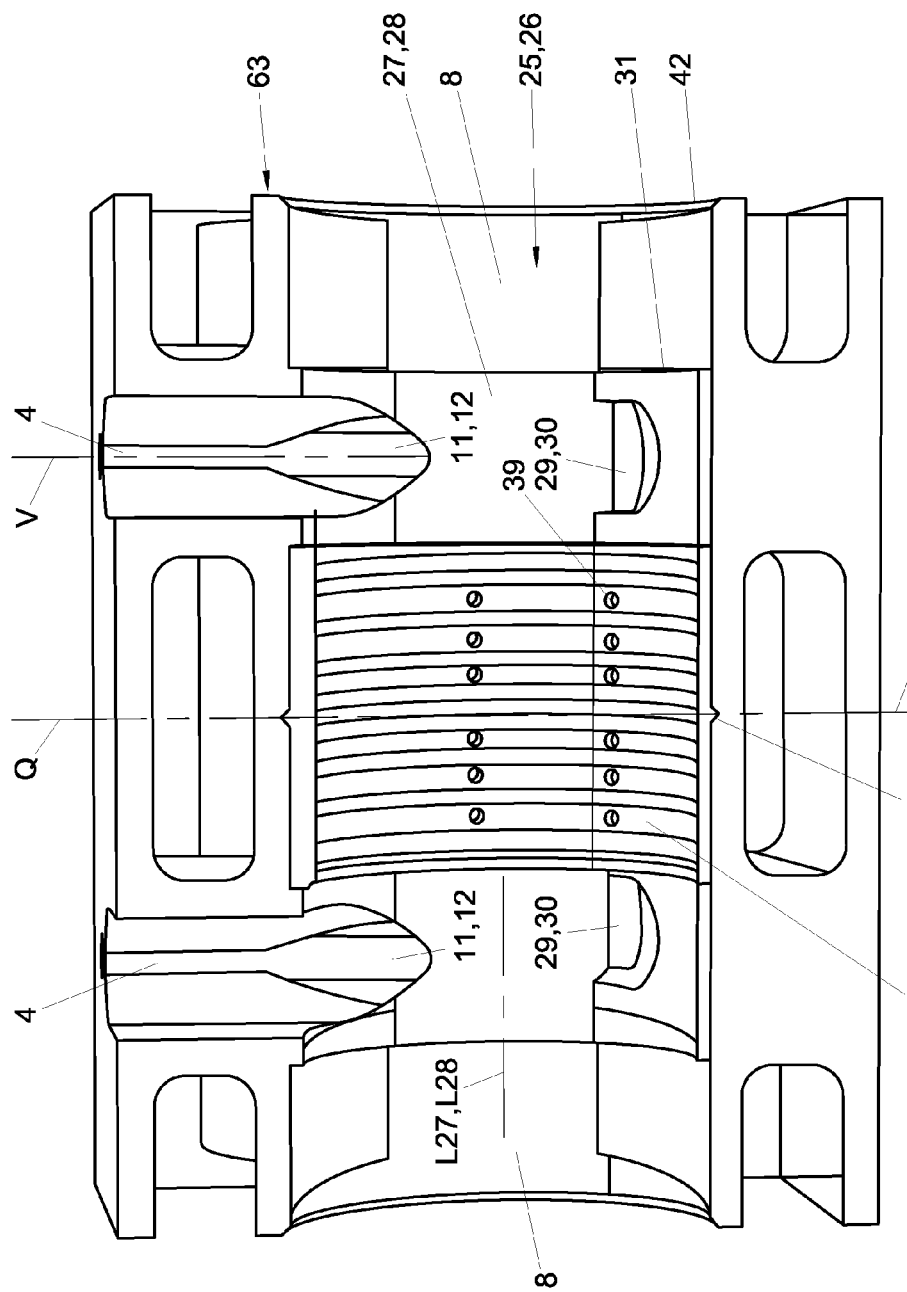
FIG. 3 shows in cross sectional view part of two modules, connected by a connector.
Figure 4:
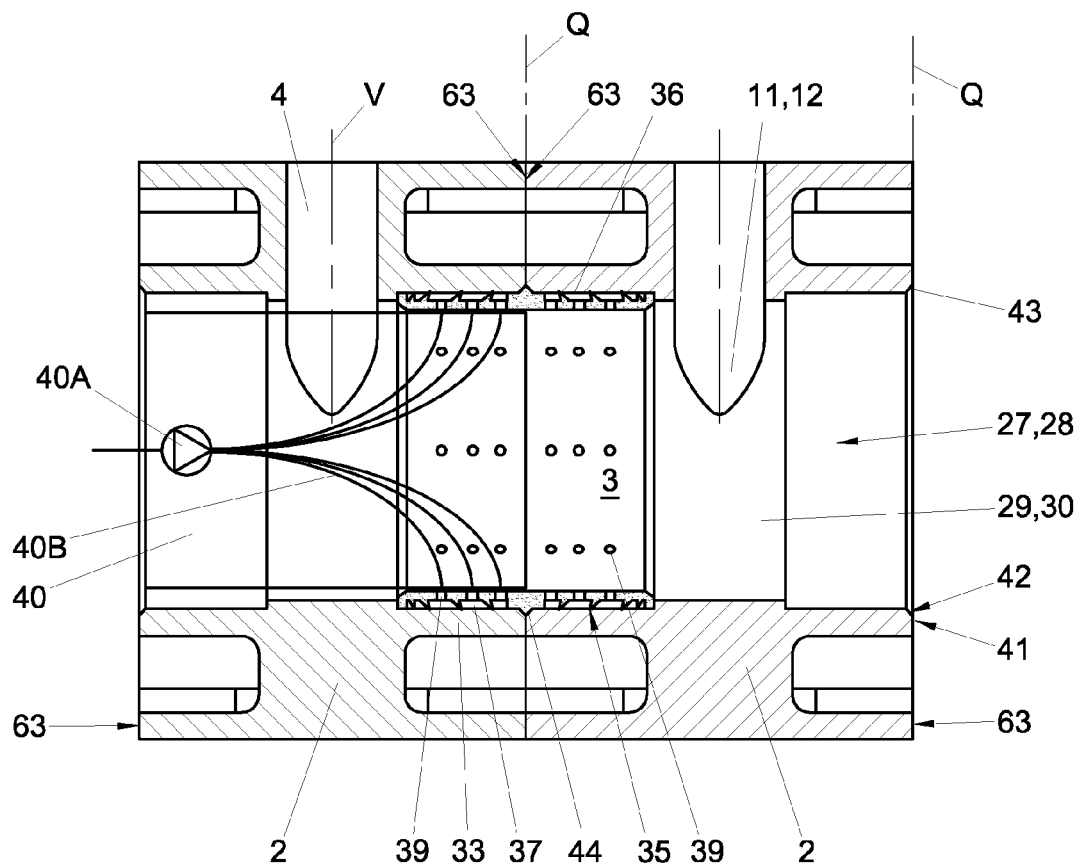
FIG. 4 shows in cross sectional view part of two modules interconnected by a connector and an injector.

In preferred embodiments the connector or connectors 3 are elements initially separate from the modules 2, and are inserted into openings 8 in two adjacent modules 2 as shown for example in FIG. 2-4. The connectors 3 can thus be made separately, from a material which can be the same or different from the material of the modules. The connectors 3 can be placed after casting of the modules 2 and after cleaning of some or all of the ducts or duct parts 4, 6 therein.

Alternatively one or more or even all of the connectors can be made integrally with a module 2, at least in part. In embodiments the said connector 3 is made of plastic and the modules 2 are made of metal. Preferably the modules 2 are made of light metal or light metal alloy, more preferably aluminum or aluminum alloy.

In the embodiment of FIG. 1 the heat exchanger 1 comprises two central or intermediate modules 2A, a first end module 2B and a second end module 2C. The central modules 2A can be of identical construction. The central modules 2A can be substantially mirror symmetrical over a mid-plane V, extending parallel to opposite side planes Q at which the modules 3 are interconnected. Obviously more than two or just one central module 2A could be used in a heat exchanger, between the end modules 2B, 2C, for example for adjusting the heat capacity of the heat exchanger. Each central module 2A comprises a central section 9 comprising two walls 10A, 10B extending in this embodiment substantially parallel to each other and to the planes V and Q, wherein between the walls 10A, B, cross walls 10C are provided, forming the part 4 of the water duct 5, having a meandering flow path between an inlet 11 and an outlet 12. In the drawings the inlet 11 is shown at a lower end and the outlet 12 is shown at an upper end of the duct part 4. As can be seen in FIG. 1 the duct part 4 can extend around an opening 13 near the upper end. The opening 13 extends though the mirror plane V and opens into both sides of the module, such that a continuous opening 13 extends through the series of modules, closed off at one longitudinal end by an end wall 14 of the second end module 2C, as will be explained later on. The area formed by the combined openings 13 can form a burner chamber 15 for the heat exchanger.

Between each pair of adjacent modules at least two connectors 3 are provided, near two opposite sides of the heat exchanger 1, such that both inlets 11 and outlets 12 of the duct parts 4 of the different modules 2 can be connected. In FIG. 2-4 a connector 3 is shown in one of the connecting ducts 25, 26, 56, as will be discussed. This is the same or similar for all these ducts. Preferably at least one such connector 3 is provided near an upper end 16 and at least one near a lower end 17 of the heat exchanger 1. As indicated the series of modules 2 is provided, at two opposite longitudinal end, with an end module 2B, 2C, wherein preferably a first series of connectors 3 connecting pairs of modules 2 form part of a first connecting duct 25 and a second series of connectors 3 connecting pairs of modules 2 form part of a second connecting duct 26, the first and second connecting ducts 25, 26 connecting opposite ends of the series of water duct parts 4 of the modules 2. To his end each central module 2A comprises a first channel part 27 having a longitudinal direction $L_{27}$ extending at an angle to and preferably substantially perpendicular to the planes Q, V, at a the lower side of the heat exchanger, and a second channel part 28 having a longitudinal direction $L_{28}$ extending at an angle to and for example substantially perpendicular to the planes Q, V, at a the upper side of the heat exchanger 1. The longitudinal axis $L_{27}$, $L_{28}$ can be substantially parallel to each other. Each channel part 27, 28 can comprise a mid section 29, 30, for example at or near the plane V, into which the inlet 11 or outlet 12 respectively opens. On either side of the mid section 29, 30 an opening 8 for insertion of a part of a connector 3 can be formed. These openings 8 can be part of the channel part 27, 28, can be substantially cylindrical having a longitudinal axis parallel to and preferably coinciding with the longitudinal axis $L_{27}$, $L_{28}$ respectively. The openings 8 can have a cross section $D_8$ slightly larger than the cross section $D_{29}$, $D_{30}$ of the mid section 29, 30, such that a shoulder 31 is formed on either side of the mid section, defining a maximum insertion depth for the connector 3. Each end module 2B, 2C similarly comprises a channel part 27A, 28A, and an opening 8 at at least one side. The opposite side can either be closed, for example by a wall or stop, or can be open, for connecting a further duct part, as will be explained.

By connecting the modules 2A, 2B, 2C as shown, by the connectors 3, the channel parts 27, 28 are connected for forming said connecting ducts 25, 26, having for example longitudinal axis $L_{27}$, $L_{28}$ extending parallel to each other and connecting the various water duct parts 4.

The central modules 2A have two opposite sides 63, such as on either side of the plane Q, each side comprising an area 18 defining a part 6 of the flue duct 7. Each of said areas 18 preferably comprises heat exchanging surface increasing elements 19. These elements 19 can for example be pins, ribs, notches and the like, or combinations thereof, as are well known from the art as for example disclosed in EP0645591 or EP0843135. The end modules 2B, 2C each have only one such area 18. The areas 18 and elements 19 are provided such that when a pair of adjacent modules 2 is interconnected, facing areas 18 of the modules form a flue duct portion 6A, preferably with a labyrinth path for flue gasses passing through said duct portion 6A from an inlet side 20 near the opening 13 to an outlet side 21 at the lower end of the heat exchanger, connected to an exhaust in a known manner, for example including a condensate collecting provision. In the embodiments shown the elements 19 extend from a wall 10 of the water duct part 4 and intensify the heat exchange between flue gas flowing through the flue duct 7 and the liquid, such as water, flowing through the water duct 5. The elements 19 can extend substantially perpendicular to the planes Q and/or V and can have free ends 22 lying substantially in the plane Q. The modules 2 comprise a flue inlet 20 and a flue outlet 21, wherein the part 6 of the flue duct 7 of each module 2 connects said flue inlet 20 with said flue outlet 21. The inlet 11 for the part 4 of the water duct 5 in said module 2 can be closer to the flue outlet 21 than to the flue inlet 20. The outlet 12 for the part 4 of the water duct 5 in said module 2 can be closer to the flue inlet 20 than to the flue outlet 21. Thus a counter flow pattern can be obtained between the flue gasses and the liquid, especially water.

In embodiments as shown in for example FIG. 1-4 each connector 3 has a substantially cylindrical hollow configuration. In embodiments the internal cross section $D_c$ can be similar to the cross section $D_{29}$, $D_{30}$ of the mid sections 29, 30 of the channel parts 27, 28. In embodiments shown the connector 3 can comprise an outer surface 32 with protrusions 33 extending outward, profiled such that seen in an insertion direction $F_{in}$ into the opening 8 the protrusions 33 have an inclined surface 34 leaning backward. The protrusions can have a top 35 engaging an inner surface 36 of the opening 8, such that these protrusions 33 counteract refraction of the connector 3 from the opening 8 when positioned therein. The protrusions preferably are compressed at least partly when inserted into said opening 8. Between the protrusions 33, which may be circumferential to the outer surface 32, or can be at least partly formed like screw threads or otherwise suitably formed, the outer surface 32 of the connector 3 and the inner surface 36 spaces 37 are formed. Through the wall 38 of the connector at least one opening 39 is provided opening into at least one of said spaces 37. Preferably several openings 39 are formed, opening in a series of such spaces, more preferably all such spaces 37.

When assembling a heat exchanger according to the present invention, modules 2 are provided with connectors 3 inserted into appropriate openings 8. When a connector 3 is placed in an opening 8 of a module, it is inserted to the appropriate depth, for example until it abuts the shoulder 31, as shown in FIG. 2. Then a bonding agent or glue is injected into at least some and preferably all of said spaces 37 in said opening 8, and allowed to set, bonding the connector 3 to the module 2. The module 2 is then provided with a bonding agent, for example the same or a similar bonding agent as used for the connector, on a side 63 thereof to be connected to an adjacent module, where after the two modules 2 are connected to each other, inserting part of the connectors 3 bonded to one of the modules into the appropriate openings 8 of the adjacent module 2, as shown in FIG. 3 for one of the connectors. Then bonding agent is injected into spaces, preferably all remaining spaces defined by the connectors 3 and module 2. To this end for example an injector 40 can be inserted through an open end of the channel part 26, 26, passed the mid section 29, 30 into the end of the connector 3 to be bonded, as schematically shown in FIG. 4. The injector 40 can comprise channels 40 B connected to the openings 39 and a pump 40 A for forcing bonding agent into the spaces 37.

The opening 8 can be provided with an outside end 41, which is provided with a first fitting element 42, for example a beveled or chamfered edge 43, wherein the connector 3 is provided with at least one protruding second fitting element 44, for example a complementary beveled or chamfered ring, for cooperation with the first fitting element 42. Such first and second fitting elements 42, 44 can aid in defining an insertion position of the connector 3, and can moreover further sealing and connection of the heat exchanger modules 2.

Figure 5:
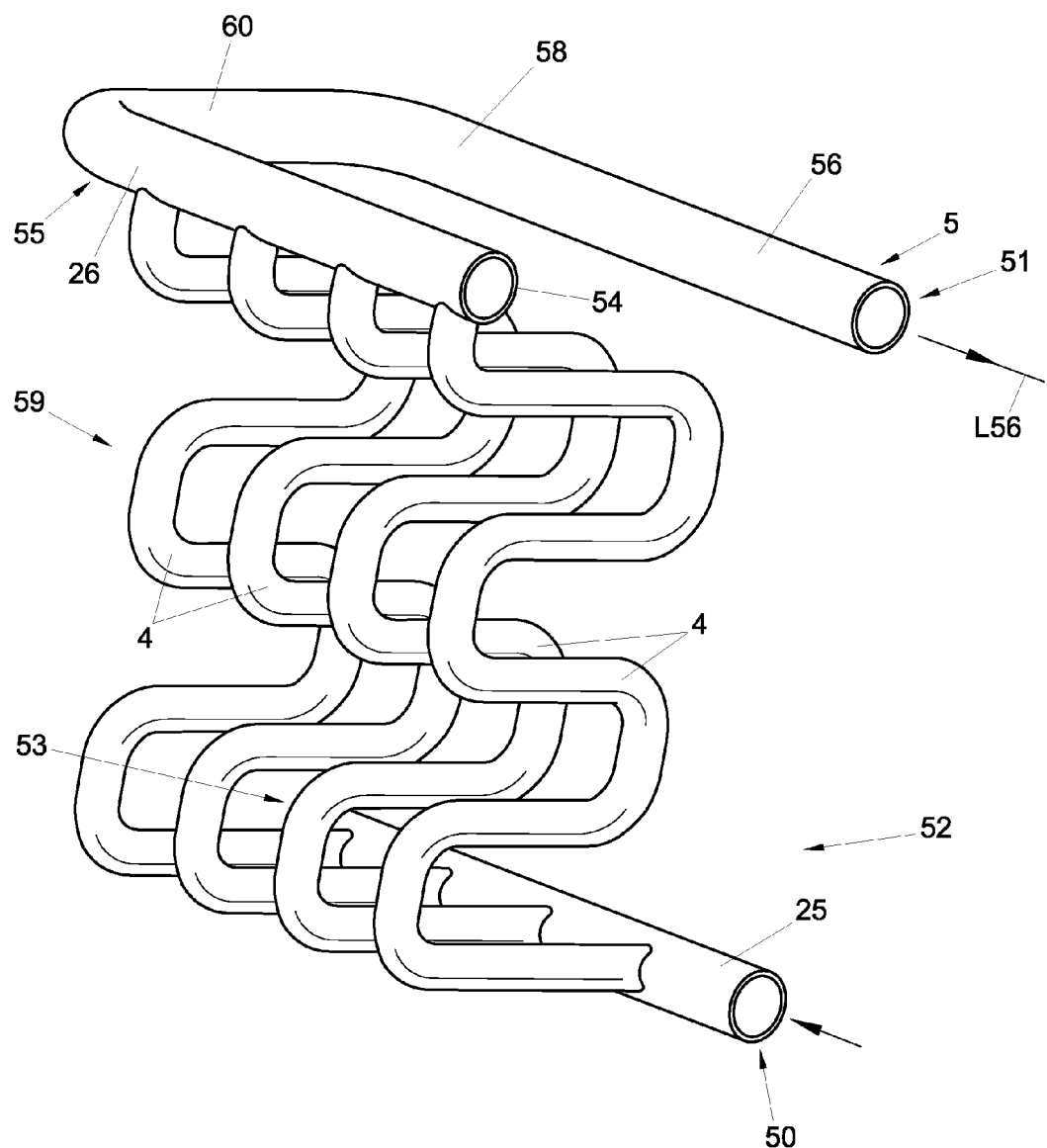
FIG. 5 schematically shows the water flow of water through the heat exchanger.

In advantageous embodiments the heat exchanger 2 can have a Tichelman flow pattern, as shown schematically in FIG. 5. In such flow pattern the water duct 5 is laid out such that the length of the flow path for the water between an inlet 50 and outlet 51 of the water duct 5 is substantially the same through each of the duct parts 4 of modules 2. In the embodiment of FIG. 5 the first connecting duct 25 extends at the lower side of the heat exchanger and comprises the inlet 50 at a first longitudinal side 52 of the heat exchanger 1, for example for connecting to a return line of a heating circuit (not shown). The opposite end 53 of the first connecting duct 25 can be closed, preferably by a wall of the relevant end module 2. The second connecting duct 26 extends substantially parallel to the first connecting duct 25, at an upper side of the heat exchanger 1. This second connecting duct can have a first end 54 at the first longitudinal end 52 of the heat exchanger which can be closed off, for example by a wall 14 of the end module 2A. The longitudinally opposite end 55 can be open and can form the outlet 51 of the water duct, for example for connecting to a feed line of a heating circuit (not shown).

In the embodiment shown in FIG. 5 a third connecting duct 56 is shown, having a longitudinal direction $L_{56}$ substantially parallel to that of the first and second connecting duct 25, 26 and positioned at the upper side of the heat exchanger 1. The third connecting duct 56 can be a duct external to the modules of the heat exchanger but is preferably integrated. In preferred embodiments the third connecting duct 56 is formed in the same or a similar way as the first and second connecting ducts 25, 26. To this end the modules 2 can each be provided with a third channel part similar to or identical to the first and second channel parts 27, 28, and provided with openings 8 for receiving a connector 3, which again can be bonded or glued or otherwise fixed in the modules 2. In such embodiments the open end 55 of the second connecting duct 26 can be connected to an end 58 of the third connecting duct 56 at the second longitudinal end 59 of the heat exchanger, whereas the outlet 51 can be formed at the opposite end of the third connecting duct 56, at the first longitudinal end 52 at the heat exchanger, that is at the same side of the heat exchanger as the inlet 50. This can be beneficial for connecting the heat exchanger to a heating circuit, improve compactness, increase heat transfer and efficiency and have other advantages. The third connecting duct 56 can be closed, apart from both longitudinal opposite ends. In embodiments the second and third connecting ducts 26, 56 can be connected by a properly bent, for example substantially U-shaped pipe 60, bonded to the ends of the connecting ducts 26, 56, to which end the end module 2 can for example be provided with appropriate openings, for example similar to the openings 8. Alternatively the connecting pipe 60 can be integrally formed with, for example in the end module 2C. such that when mounting the end module 2C to an adjacent intermediate module 2A the connection between the connecting ducts 26, 56 is made automatically.

In a heat exchanger 1 according to the present disclosure, the connectors 3 are preferably bonded into the modules, such that they form heat and pressure resistant connections for the water duct, which will during use be at the highest pressure in the heat exchanger. The water duct parts 4 in the modules can further be integrally formed and thus need no further sealing. By bonding the end surfaces Q of the modules 2 to each other, the flue duct parts 6 of the modules and the openings 13 for forming the burner space are also properly connected and sealed, especially gas tight. The gas pressure shall normally be lower than the water pressure.

An advantage of the present heat exchanger can be that it can be build up gradually, by for example starting with an end module, for example the first end module 2B, then mounting subsequently a series of intermediate modules 2A to said end module 2B or a previous intermediate module 2A respectively, and finally mounting the second end module 2C to the last intermediate module 2A of the series. Such series can comprise any desired number of intermediate modules, whereas a heat exchanger could even be formed by the two end modules 2B, 2C only.

In embodiments the end surfaces of the modules to be connected to each other can be formed mainly by end surfaces or ridges of relatively thin walls of the heat exchanger modules 2. As can be seen in FIG. 1 the second end module 2 can have a substantially closed end surface or wall 14, with for example only the an outlet 51 of a water duct 5. Said wall 14 can form part of a wall 10 of the water duct part 4 and can close the opening 31 of said module 2. The opposite first end module can similarly be provided with a substantially closed end wall 14, forming part of a wall 10 of the relevant water duct part 4, and can be provided with an opening 13 for mounting a provision for creating flue gasses, such as a burner or fan, for example a modulating fan, a gas supply, ignition means and the like as known in the art. Furthermore the first end module 2B can be provided with the inlet 50. In embodiments having the inlet and outlet at the same longitudinal end 52 of the heat exchanger 1 the one end module can be closed at one side and comprise the pipe 60, whereas the opposite end module can have the inlet 50 and outlet 51, as discussed.

In the present disclosure embodiments of heat exchangers according to the present invention have been disclosed by way of example only. These should by no means be understood as limiting the scope of the invention as disclosed. Many variations are possible, including but not limited to all combinations of parts and features of the embodiments specifically disclosed. Furthermore for example openings in modules, especially end modules can be closed by stops or the like, for example bonded or welded in placed, in stead of by wall parts of the modules. The water duct parts and flue duct parts could be formed and shaped in a different manner, for example for obtaining a different flow path, altered resistance, or for amending the efficiency. The connectors and openings can be shaped differently, for example non cylindrical, such that the connectors can have one or more defined position in the opening. The modules and/or connectors can be made of different materials or by different methods. A heat exchanger could be provided with two or more separate water ducts, for example one for heating water to be used in a space heating circuit and one for heating tapping water. These any many such variations are considered falling within the scope of this disclosure.

The invention claimed is:

1. Heat exchanger, comprising a series of interconnected modules, each module comprising at least part of a water duct and part of a flue duct, wherein at least the parts of the water ducts of successive modules are interconnected, forming at least one continuous water duct through and/or along a number of said modules, wherein water duct parts of two adjacent modules are interconnected by a connector inserted into an opening in at least one of the modules forming a sealing connection, wherein the connector is provided with at least one opening, extending through a wall part thereof, for injecting a bonding agent between an outer surface part of the connector and an inner surface part of the opening in the at least one of the modules.

2. Heat exchanger according to claim 1, wherein the connector is inserted into openings in both modules.

3. Heat exchanger according to claim 1, wherein the connector is bonded into position by the bonding agent.

4. Heat exchanger according to claim 1, wherein between each pair of adjacent modules at least two connectors are provided, near two opposite sides of the heat exchanger.

5. Heat exchanger according to claim 1, wherein said connector is made of plastic and the modules are made of metal.

6. Heat exchanger according to claim 1, wherein said connector comprises an outer surface with protrusions extending outward, profiled such that seen in an insertion direction into the opening the protrusions have an inclined surface leaning backward, having a top engaging an inner surface of the opening, such that these protrusions counteract retraction of the connector from the opening when positioned therein.

7. Heat exchanger according to claim 1, wherein said at least one opening is a series of openings.

8. Heat exchanger according to claim 1, wherein the opening, into which the connector is inserted, is provided with an outside end, which is provided with a first fitting element, and wherein the connector is provided with at least one protruding second fitting element for cooperation with the first fitting element, for defining an insertion position of the connector.

9. Heat exchanger according to claim 1, wherein modules comprise an flue inlet and a flue outlet, and wherein the part of the flue duct of each module connects said flue inlet with said flue outlet, wherein an inlet for the part of the water duct in said module is closer to the flue outlet than to the flue inlet and wherein an outlet for the part of the water duct in said module is closer to the flue inlet than to the flue outlet.

10. Heat exchanger according to claim 1, wherein the modules have two opposite sides, each comprising an area defining said part of a flue duct, wherein each of said areas preferably comprises heat exchanging surface increasing elements, such that when a pair of adjacent modules is interconnected by at least said one connector, facing areas of the modules form a flue duct portion.

11. Heat exchanger according to claim 1, wherein the series of modules is provided, at two opposite ends, with an end module, wherein a first series of connectors connecting pairs of modules form part of a first connecting duct and a second series of connectors connecting pairs of modules form part of a second connecting duct, the first and second connecting ducts connecting opposite ends of the series of water duct parts of the modules.

12. Heat exchanger according to claim 1, wherein each module has an edge portion extending around at least part of the duct forming part thereof, wherein said edge portions of adjacent modules have been glued together, connecting the modules and sealing the flue duct forming parts for forming a flue duct between said adjacent modules.

13. Heat exchanger according to claim 1, wherein the connectors have an internal passage having a cross section perpendicular to a direction of flow through said passage which is larger than the largest cross section of the parts of the water ducts formed in the modules.

14. Module comprising at least part of a water duct and part of a flue duct, the module further comprising a connector inserted into the part of the water duct, wherein the connector is provided with at least one opening, extending through a wall part thereof, for injecting a bonding agent between an outer surface part of the connector and an inner surface of the module, said connector configured for forming a sealing connection between the part of the water duct and a part of a water duct of a successive module when interconnected.

15. Heating boiler comprising a heat exchanger according to claim 1.

16. Heat exchanger according to claim 3, wherein the bonding agent is glue that forms at least part of the sealing connection.

17. Heat exchanger according to claim 4, wherein the two opposite sides of the heat exchanger, near which the at least two connectors are provided, are respectively an upper end and a lower end of the heat exchanger.

18. Heat exchanger according to claim 5, wherein the metal is aluminum or an aluminum alloy.

19. Heat exchanger according to claim 6, wherein the protrusions are compressed when inserted into said opening.

20. Heat exchanger according to claim 8, wherein the first fitting element is beveled or chamfered.

21. Heat exchanger according to claim 10, wherein the flue duct portion includes a labyrinth path for flue gasses passing through said duct portion.

22. Heat exchanger according to claim 12, wherein the edge portion extends around all of the duct forming part thereof.

23. Heat exchanger, comprising a series of interconnected modules, each module comprising at least part of a water duct and part of a flue duct, wherein at least the parts of the water ducts of successive modules are interconnected, forming at least two continuous water ducts through and/or along a number of said modules, wherein water duct parts of two adjacent modules are interconnected by a connector inserted into an opening in at least one of the modules forming a sealing connection, wherein the modules each further comprise a flue inlet and a flue outlet, and wherein the part of the flue duct of each module connects said flue inlet with said flue outlet, wherein an inlet for the part of the water duct in said module is closer to the flue outlet than to the flue inlet and wherein an outlet for the part of the water duct in said module is closer to the flue inlet than to the flue outlet, and wherein
    each of said interconnected modules further comprises a duct part extending around an opening near an upper end of the module, wherein said part of the flue duct comprises said opening and extends through each module, providing a continuous opening through the series of modules that forms a burner chamber for the heat exchanger, wherein a first of said at least two continuous water ducts extends above said burner chamber and a second of said at least two continuous water ducts extends below said burner chamber.

24. Heat exchanger according to claim 23, wherein the flue outlet of each module in said series of modules is provided at a lower end of the heat exchanger, including a condensate collecting provision.

25. Heat exchanger according to claim 23, wherein each module in said series of modules has two opposite sides, each side comprising an area defining said part of a flue duct and comprising heat exchanging surface increasing elements, such that when said water duct parts of said two adjacent modules are interconnected by said connector, facing areas of said two modules form a flue duct portion, wherein the series of modules is provided, at two opposite ends, with an end module, wherein a first series of connectors connecting pairs of modules form part of a first connecting duct and a second series of connectors connecting pairs of modules form part of a second connecting duct, the first and second connecting ducts connecting opposite ends of the water duct parts of the modules, wherein the flue inlets of the series of modules form a first continuous flue duct suitable for receiving a burner and the flue outlets of the series of modules form a second continuous flue duct through the series of modules.

26. Heat exchanger according to claim 25, wherein the first and second connecting ducts extend substantially parallel to each other, wherein a third series of connectors connecting pairs of modules form part of a third connecting duct, extending substantially parallel to the first and second connecting ducts, wherein a duct part is provided, connecting ends of the second and third connecting duct, wherein the first and second connecting ducts each have one closed end, such that an open end of the first connecting duct is positioned at the same side of the series of modules as an open end of the third connecting duct.

* * * * *